United States Patent Office 2,817,546
Patented Dec. 24, 1957

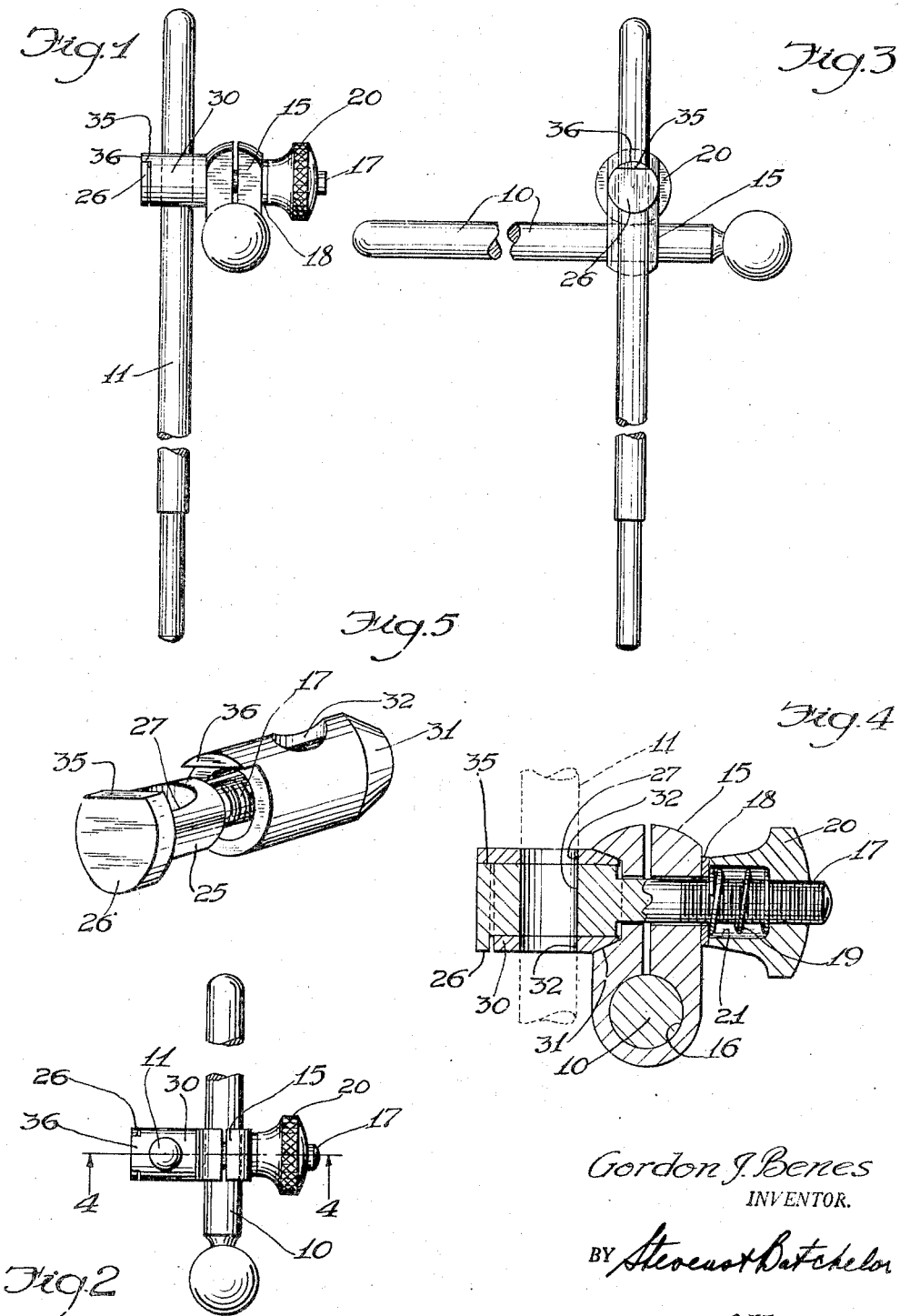

2,817,546

ROD CLAMPS

Gordon J. Benes, Chicago, Ill., assignor to Enco Magnetic Tool Company, Chicago, Ill.

Application September 8, 1953, Serial No. 378,999

3 Claims. (Cl. 287—54)

My invention relates to devices designed to clamp rods at different angles to each other. Several devices for this purpose have appeared on the market and follow the same general construction. Thus, a jaw clamp is provided for one rod and operated by the drawing action of a nut on a screw which passes through the jaws of the clamp. The screw is part of a stem which is disposed in a sleeve, and the action of the nut also serves to draw the sleeve to the clamp. The stem and the sleeve are perforated crosswise for the passage of the second rod, and it is necessary for the perforation in the stem to register with those in the walls of the sleeve in order to make the passage of the rod through both the stem and the sleeve possible. Before the second rod is applied, it may be necessary either to adjust the stem by hand or to provide locking means between the stem and the sleeve before the perforations therein can be made to register, as stated. Various locking means have been devised for this purpose which are more or less involved, and it is one object of the present invention to provide a locking means which is exceedingly simple and efficient.

A further object is to design the novel locking means as a part of the stem and sleeve, so that no extra parts are required to produce the locking means.

An additional object is to design the stem and sleeve of the clamp in a manner to present elements which cooperate to lock the stem from rotation within the sleeve and insure the exact registration of the perforations in these parts.

An important object is to incorporate the locking means in the clamp without any change in the size or general outward appearance thereof.

With the above objects in view, a better understanding of the invention may be had by reference to the accompanying drawing, in which—

Fig. 1 is an elevation of the improved clamp as applied to a pair of rods;

Fig. 2 is an enlarged elevation of the clamp alone;

Fig. 3 is a view from the left-hand side of Fig. 2;

Fig. 4 is a longitudinal section, with one rod indicated by dotted lines; and

Fig. 5 is a perspective view showing the locking means more clearly.

In acordance with the foregoing, specific reference to the drawing indicates the initial rod to which the clamp is applied at 10. Such rod may be mounted in a stationary or movable relation—such as by the ball joint component indicated —to a suitable base; and a second rod 11 is designed to be carried by the first rod as an adjustable extension thereof. The basic element of the novel device is a double jaw clamp 15 which is perforated at 16 to be slidable on the rod 10. The jaws of the clamp 15 are perforated for the transverse passage of a screw 17 which extends from one side of the clamp to first receive a washer 18, then a spring 19, and finally a thumb nut 20. The latter is chambered at 21 to accommodate the spring 19 on the inside.

The screw 17 is a reduced portion of a cylindrical stem 25 which extends from the opposite side of the clamp 15 and has a head 26 at its outer end. The stem is made with a transverse bore 27 of a diameter to receive the rod 11 slidably.

The stem 25 is slidably and rotatably disposed in a cylindrical sleeve 30, one end of the latter being tapered, as indicated at 31, to seat in a conical recess made in the related side of the clamp 15. The external diameter of the sleeve 30 and the stem head 26 is the same; and the advance of the stem through the sleeve ends when the head 26 of the stem meets the outer end of the sleeve. The latter is bored crosswise with alined perforations 32 with which the bore 27 in the stem is designed to register when the stem has been applied endwise as stated and rotated accordingly, as shown in Fig. 4.

It is now possible to pass the second rod 11 through the sleeve and stem, as indicated by dotted lines in Fig. 4; and the advance of the thumb nut 20 on the screw 17 will now serve to draw the stem against the rod 11 in order to first clamp the same to the sleeve. The pressure of the rod on the sleeve causes the latter to bear on the jaws of the clamp 15, whereby to engage the same with the rod 10.

The two rods now are clamped to each other; and the slight loosening of the thumb nut will make several adjustments of the parts possible, such as lowering or raising the clamp along the rod 10, or turning the clamp on the latter. Also, it wil be possible to extend, back, or turn the rod 11 in the sleeve or angularly in respect to the rod 10.

With the device as described so far, one would have to ascertain the registering position of the stem bore 27 with the sleeve perforations 32 before passing the second rod 11 through the sleeve and stem, since no means have been described for insuring such registration. In other words, the stem would have to be turned by hand until its bore registers with the perforations in the sleeve and the parts held still while the rod is inserted.

The present improvement involves a locking device which insures the registration of the stem bore 27 with the sleeve perforations 32 the moment the stem is assembled with the sleeve endwise. Thus, the head 26 of the stem is made with a flat peripheral portion 35; and the wall of the sleeve 30 is extended outwardly with a segmental lip 36. When the stem 25 is inserted in the sleeve, it is only necessary to match the flat portion 35 with the lip 36 when the advance of the stem is about to end, so that such portion and lip fit each other, locking the stem from rotation relative to the sleeve. With the stem bore 27 calculated to register with the perforations in the sleeve in this event, the alinement of the stem and the sleeve for the insertion of the rod 11 is insured.

It will now be apparent that the improved locking means is exceedingly simple by being made as a part of the clamp assembly. No additional cost therefore is involved for extra parts or operations to include the locking means, as the stem and the sleeve can be machined with the proper formations and thus retain their simple form. Besides, no enlargement or extension of either the stem or the sleeve is involved by the inclusion of the locking means, and the assembly therefore preserves its neat and compact appearance.

While I have described the invention along specific lines, various minor changes or refinements may be made therein without departing from its principle, and I reserve the right to employ all such changes and refinements as may come within the scope and spirt of the appended claims.

I claim:

1. A rod clamp comprising a U-shaped unit whose base forms jaws to clamp a rod slidable in the base, companion extensions of said jaws, a sleeve engaging the outer side of one of said extensions with one end, the extensions having alined cross-bores in communication with the bore in the sleeve, the latter having alined transverse bores, a screw slidable in said cross-bores and formed with a stem at one end journaled in the sleeve, said stem having a transverse bore adapted to register with the sleeve bores and facilitate the passing of a second rod through the stem and the sleeve, and a nut applicable to the other end of the screw to draw on the same and clamp said rods to the unit.

2. The structure of claim 1, said engagement seating the sleeve for axial rotation relative to said unit.

3. The structure of claim 1, the other end of the sleeve extending with a segmental lip, and a head carried by the outer end of the stem and designed to approach said other end when the nut is rotated to draw on the screw until said bores become alined, and said head having a flat peripheral portion, said lip engaging the latter to prevent the screw from rotating and turning the stem bore out of alinement with the sleeve bores.

References Cited in the file of this patent

UNITED STATES PATENTS

| | | |
|---|---|---|
| 1,031,075 | Lundin | July 2, 1912 |
| 1,878,320 | Potter | Sept. 20, 1932 |
| 2,310,276 | Bilz | Feb. 9, 1943 |
| 2,456,505 | Hastings | Dec. 14, 1948 |
| 2,466,717 | Littell | Apr. 12, 1949 |
| 2,484,551 | Brouse | Oct. 11, 1949 |